United States Patent
Henze et al.

(10) Patent No.: US 6,639,753 B1
(45) Date of Patent: Oct. 28, 2003

(54) METHOD OF FORMING A HEAD ASSEMBLY, A HEAD ASSEMBLY, AND A LINEAR TAPE DRIVE

(75) Inventors: Richard H. Henze, San Carlos, CA (US); Albert H. Jeans, Mountain View, CA (US); Paul W. Poorman, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 98 days.

(21) Appl. No.: 09/654,489

(22) Filed: Sep. 1, 2000

(51) Int. Cl.[7] .................. G11B 5/187; G11B 5/255; G11B 5/29
(52) U.S. Cl. .................. 360/121; 360/122; 360/126; 360/129; 360/235.4
(58) Field of Search .................. 360/129, 121, 360/125, 122, 126, 235.4

(56) References Cited

U.S. PATENT DOCUMENTS

| | | | |
|---|---|---|---|
| 3,686,466 A | 8/1972 | Sato et al. .................. 360/110 |
| 3,864,753 A | 2/1975 | Becker et al. .................. 360/121 |
| 4,797,767 A * | 1/1989 | Baus, Jr. .................. 360/121 |
| 4,825,532 A * | 5/1989 | Ricards .................. 360/122 |
| 5,541,793 A * | 7/1996 | Schwarz .................. 360/121 |
| 5,710,683 A | 1/1998 | Sundaram .................. 360/126 |
| 5,781,383 A * | 7/1998 | Strand .................. 360/122 |
| 5,896,253 A * | 4/1999 | Dirne et al. .................. 360/122 |
| 6,097,570 A | 8/2000 | Dee .................. 360/121 |
| 6,236,537 B1 * | 5/2001 | Poorman et al. .................. 360/122 |
| 6,282,051 B1 * | 8/2001 | Albrecht et al. .................. 360/75 |

* cited by examiner

*Primary Examiner*—Jefferson Evans (57) ABSTRACT

Methods of forming a head assembly, a head assembly, and a linear tape drive are provided. One aspect provides a method of forming a head assembly including providing a base member; forming a plurality of head components upon the base member individually adapted to communicate information relative to a tape; providing a plurality of component regions adjacent respective ones of the head components and a path of travel of the tape; and providing a support region intermediate adjacent ones of the head components and positioned to support the tape moving along the path of travel, the support region comprising a material different than a material of the component regions.

18 Claims, 8 Drawing Sheets

(2 of 8 Drawing Sheet(s) Filed in Color)

METHOD OF FORMING A HEAD ASSEMBLY, A HEAD ASSEMBLY, AND A LINEAR TAPE DRIVE

FIELD OF THE INVENTION

The present invention relates to a method of forming a head assembly, a head assembly, and a linear tape drive.

BACKGROUND OF THE INVENTION

High capacity storage capabilities are becoming more commonplace and desired in numerous applications, such as libraries, back-up and archive configurations, for example. It is desired for arrangements to provide such back-up capabilities without interrupting business operations. Increased speed, accessibility and reliability are additionally desired for providing long-term storage of digital data.

The Linear Tape Open (LTO) Ultrium format has been developed as a linear tape format to provide enhanced high capacity storage. First generation configurations deliver up to 100 GB of native data capacity on a single cartridge. Future configurations are believed scalable to provide single-cartridge native data capacities of 1.6 TB.

Figure 1:
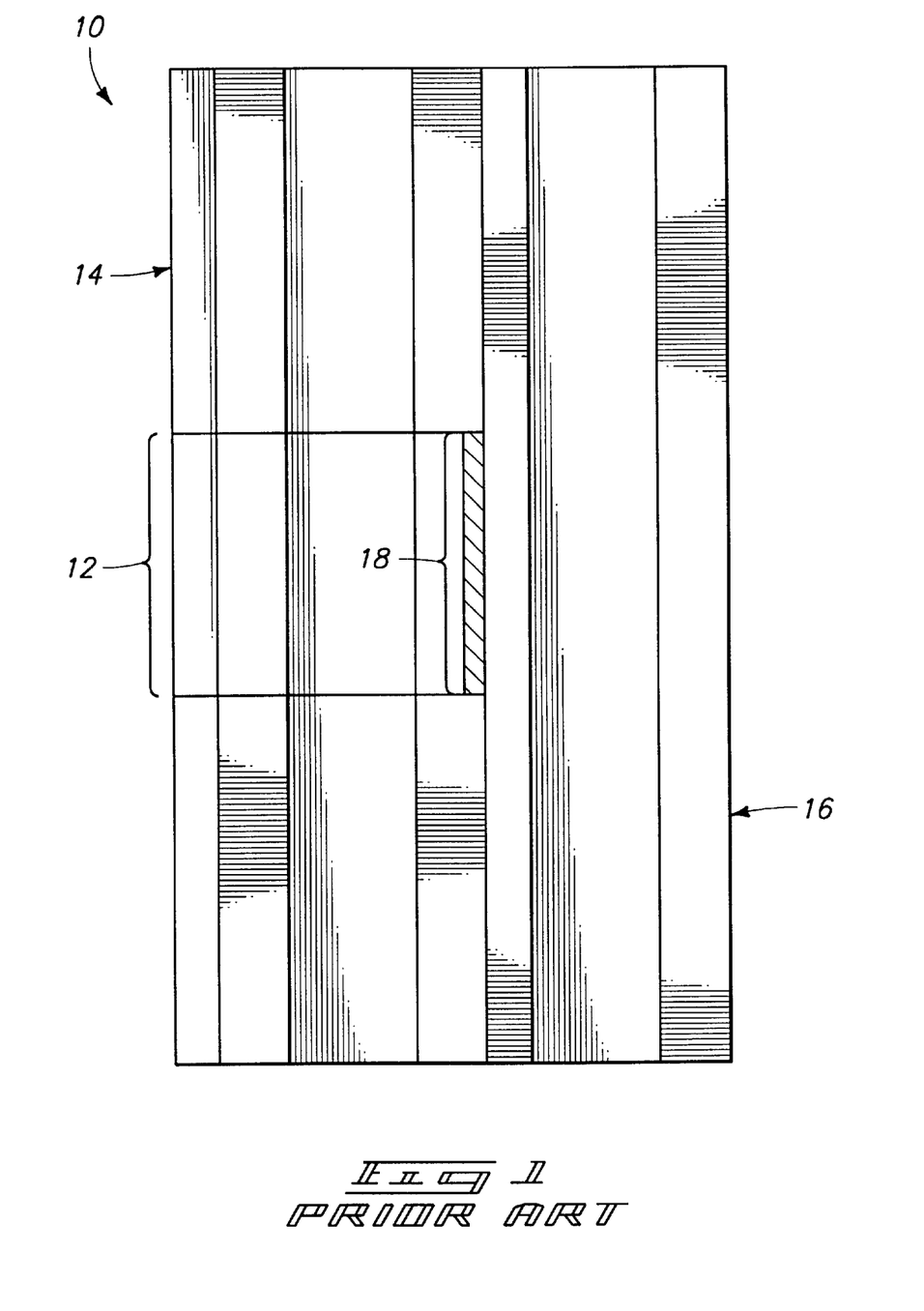
FIG. 1 is a plan view of a conventional head configuration.

Referring to FIG. 1, a conventional head configuration 10 for writing and reading data within a high capacity storage device is illustrated. The depicted configuration 10 includes a head die substrate 12, filler block 14 and cover bar 16. Head elements are provided within a region 18 including a plurality of deposited layers and an insulating matrix. Exemplary deposited layers include metallic magnetic materials to provide write poles, shields and magneto-resistive read elements. Such is typically deposited upon die substrate 12 and contained between die substrate 12 and cover bar 16. The insulating matrix and layers typically comprise relatively soft materials (compared with the substrate and cover bar) due to fabrication methodologies. The soft materials are susceptible to increased wear compared to other portions of the head assembly including the substrate 12 and the cover bar 16.

Accordingly, numerous conventional configurations suffer from pole tip recession wherein the insulating matrix and layers are abrasively removed by a tape passing thereover during use. These conventional head configurations are subject to spacing loss in magnetic tape recording resulting from the pole tip recession. Such spacing loss decreases the density of recording capabilities of data upon a given magnetic tape.

Figure 2:
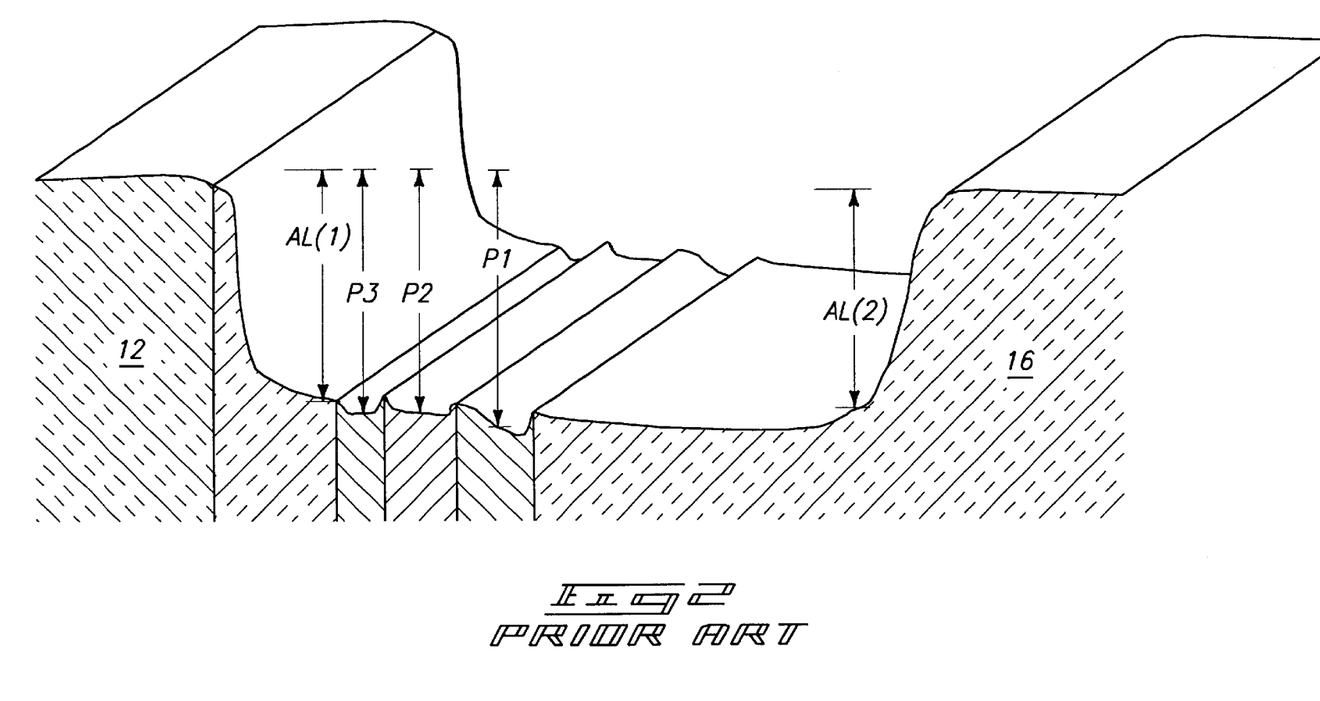
FIG. 2 is a detailed cross-sectional view depicting a profile of pole tip recession of a conventional head arrangement.

Referring to FIG. 2, pole tip recession is illustrated within a conventional head arrangement within region 18. The depicted configuration includes AL(1) corresponding to a layer of relatively soft material, such as deposited alumina, upon substrate 12. Designation P3 corresponds to a shield adjacent a read element (not labeled). Designation P2 corresponds to a shared shield/pole adjacent the read element. Designation P1 corresponds to a write pole and AL(2) corresponds to a layer of alumina material over the deposited layers forming the head elements. Such heightened susceptibility to pole tip recession decreases the maximum attainable recording density in conventional devices.

For future increases in linear recording density, there exists a need to provide improved devices and methodologies having improvements over the prior art devices.

SUMMARY OF THE INVENTION

The invention provides a method of forming a head assembly, a head assembly, and a linear tape drive.

One aspect of the present invention provides a method of forming a head assembly comprising: providing a base member; forming a plurality of head components upon the base member individually adapted to communicate information relative to a tape; providing a plurality of component regions adjacent respective ones of the head components and a path of travel of the tape; and providing a support region intermediate adjacent ones of the head components and positioned to support the tape moving along the path of travel, the support region comprising a material different than a material of the component regions.

Another aspect of the present invention provides a head assembly configured to communicate information relative to a tape comprising: a base member; and a head member adjacent the base member and comprising: a plurality of head components adjacent a path of travel of a tape and adapted to communicate information relative to the tape; a plurality of component regions adjacent the path of travel of the tape and respective ones of the head components; and a support region intermediate adjacent ones of the head components and positioned to support a tape moving along the path of travel, the support region comprising a material different than a material of the component regions.

Yet another aspect of the present invention provides a linear tape drive configured to communicate information relative to a tape comprising: an input adapted to couple with an external device; a cartridge receiving assembly adapted to receive a cartridge including a tape; and a head assembly positioned adjacent a path of travel of the tape, the head assembly comprising: a base member; a cover member adjacent the base member; a head member intermediate the base member and the cover member and comprising: a plurality of head components configured to communicate information relative to the tape including reading information from the tape and writing information to the tape; a plurality of component regions adjacent the path of travel of the tape and respective ones of the head components; and a support region intermediate adjacent ones of the head components and positioned to support a tape moving along the path of travel, the support region comprising a material having a hardness greater than a material of the component regions.

Other features and advantages of the invention will become apparent to those of ordinary skill in the art upon review of the following detailed description, claims, and drawings.

DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 7 is a cross-sectional view depicting a plurality of head components.

FIG. 8 is a cross-sectional view taken along line 8—8 in FIG. 7.

DETAILED DESCRIPTION OF PREFERRED EMBODIMENTS

Figure 3:
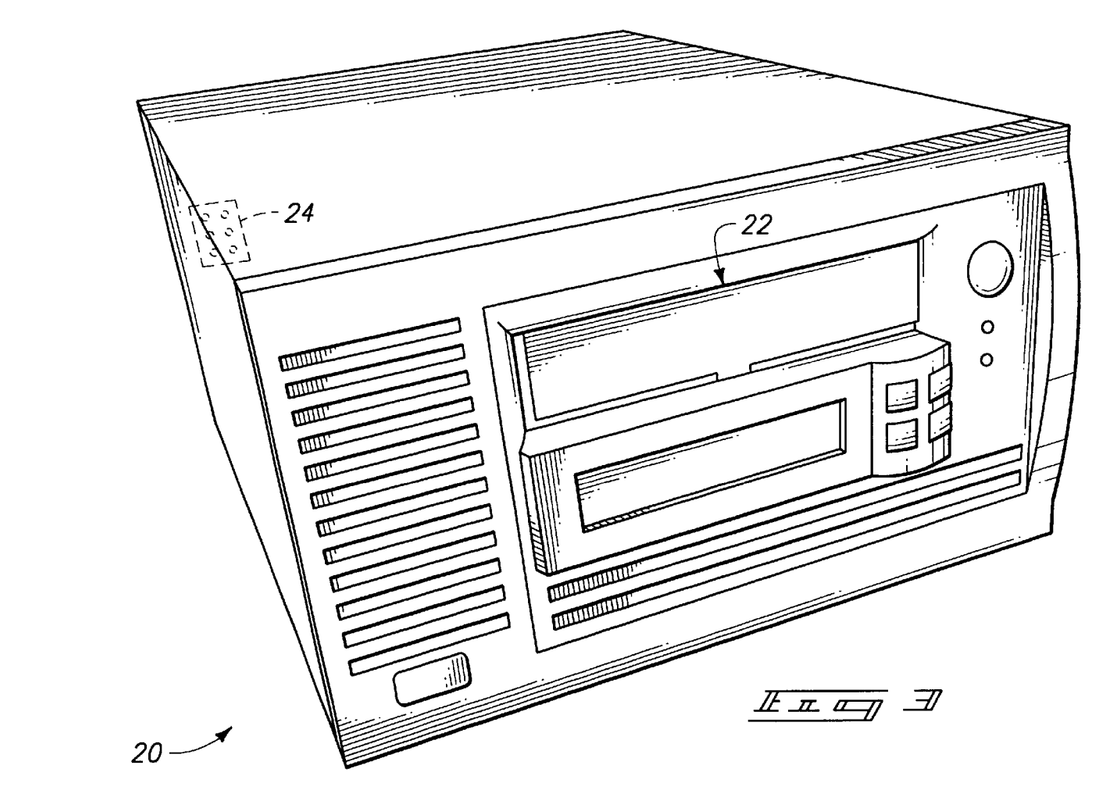
FIG. 3 is a perspective view of an exemplary tape drive embodying aspects of the present invention.

Referring to FIG. 3, an exemplary tape drive 20 embodying aspects of the present invention is illustrated. The depicted tape drive 20 Implements Linear Tape-open (LTO) technology according to the Ultrium format to provide mass storage capabilities. The Ultrium format is described in Ralph Simmons, "HDD Technologies Key to Ultrium Tape", Data Storage, June, 2000, pp 25–28, incorporated by reference herein. Such embodiment is exemplary and other technologies or formats may be utilized in accordance with the present invention. For example, other possible formats include Digital Linear Tape (DLT) or any helical scan tape formats utilizing multi-channel thin film heads.

According to the Ultrium format, a magnetic tape utilized for storage and retrieval includes four data bands individually comprising 96 data tracks. Servo bands are provided upon opposite sides of the data bands of the magnetic tape. Servo bands are encoded with vertical and longitudinal position information to enable accessing of tracks within the data bands.

The illustrated tape drive 20 includes a cartridge receiving assembly 22 adapted to receive a cartridge including media, such as a magnetic tape, for data storage and retrieval. Tape drive 20 includes an input/output device 24 for coupling to an external device for providing data transfer with respect to tape drive 20. For example, input/output device 24 is coupled with an external device such as a computer, a server, a storage area network, or other device to provide backup or archival storage capabilities.

Figure 4:
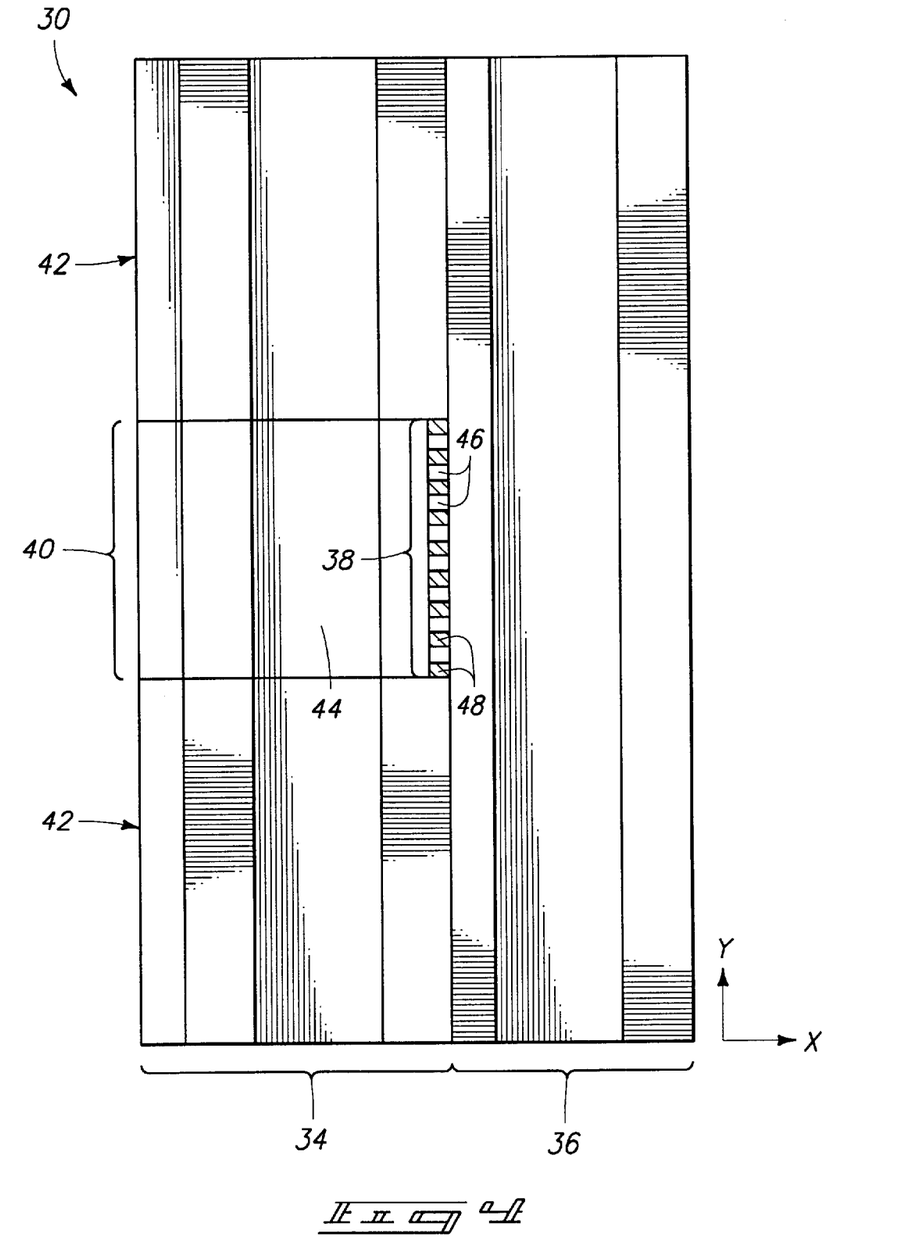
FIG. 4 is a plan view of a first embodiment of a head assembly according to aspects of the present invention.
Figure 5:
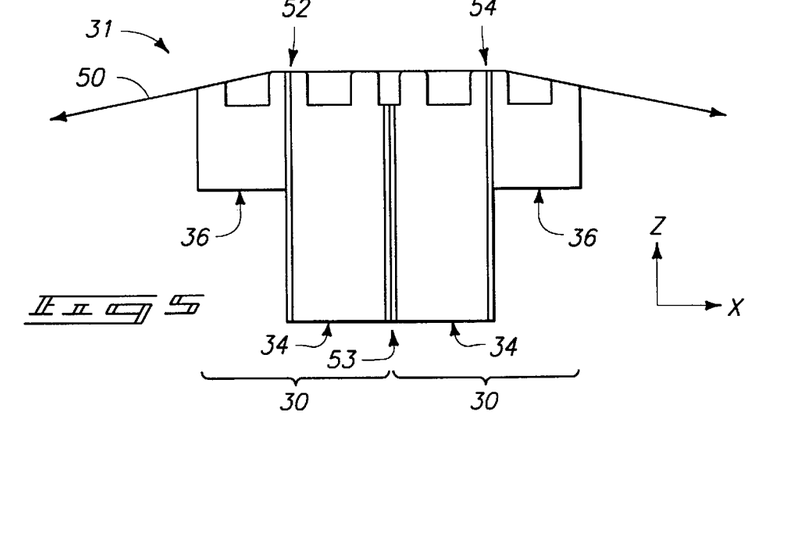
FIG. 5 is a side elevation view of a two bump head assembly embodying aspects of the present invention.

Referring to FIG. 4, an exemplary head assembly 30 of tape drive 20 is depicted. The illustrated head assembly 30 is referred to as a single bump head assembly (a double bump head assembly 31 is illustrated in FIG. 5). The illustrated head assembly 30 includes a base member 34, a cover member 36, and a head member 38 positione intermediate between the base member 34 and the cover member 36.

Base member 34 comprises a head chip 40 and a filler block 42 in the described arrangement. Head chip 40 includes a head die substrate 44 and head member 38 in the depicted configuration. Substrate 44 is provided as a wafer, such as $Al_2O_3TiC$, and layers are subsequently formed upon substrate 44 to form head member 38. Head member 38 may be referred to as a head array in the illustrated embodiment. In the described exemplary embodiment, layers formed upon substrate 44 comprise an alumina matrix and successive layers of metallic magnetic materials to act as write poles, shields and magneto-resistive read elements. Exemplary materials of the poles includes NiFe, FeTaN, or FeAIN. Filler block 42 and cover member 36 comprise $Al_2O_3TiC$ in the described arrangement.

The depicted head member 38 includes a plurality of component regions 46 and support regions 48. Head member 38 including component regions 46 and support regions 48 are described in detail below with reference to FIG. 7.

Head assembly 30 is typically positioned adjacent to a path of travel of media such as magnetic tape. The path of travel extends in the X direction with reference to FIG. 4. Motors (not shown) of tape drive 20 are provided to move head assembly 30 in the Y direction to access various data bands of the media passing in X direction. Head chip 40 has a width (Y dimension) of approximately 8 mm in the described embodiment.

Referring to FIG. 5, the depicted head assembly 31, comprising a double bump assembly, is illustrated adjacent media 50, such as magnetic tape, moving substantially in the X direction along a path of travel. Head assembly 31 comprises two head assemblies 30 positioned adjacent one another in a mirrored arrangement. A layer 53 comprising a shield and a glue is utilized to couple head assemblies 30. Head assemblies 30 provide plural bumps 52, 54 individually comprising a plurality of head components (illustrated in FIG. 6 and FIG. 7). According to the Ultrium format, eight head components are provided within a single one of bumps 52, 54. Bumps 52, 54 individually include a read element and write element to communicate information with respect to media 50 in one exemplary configuration. For example, if media 50 is traveling in a direction to the right, bump 52 may be utilized to write data to media 50 while bump 54 is configured to read the just-written-track of the media 50 to verify correct data transfer. Other configurations provide bumps 52, 54 including one of a read element or write element.

Figure 6:
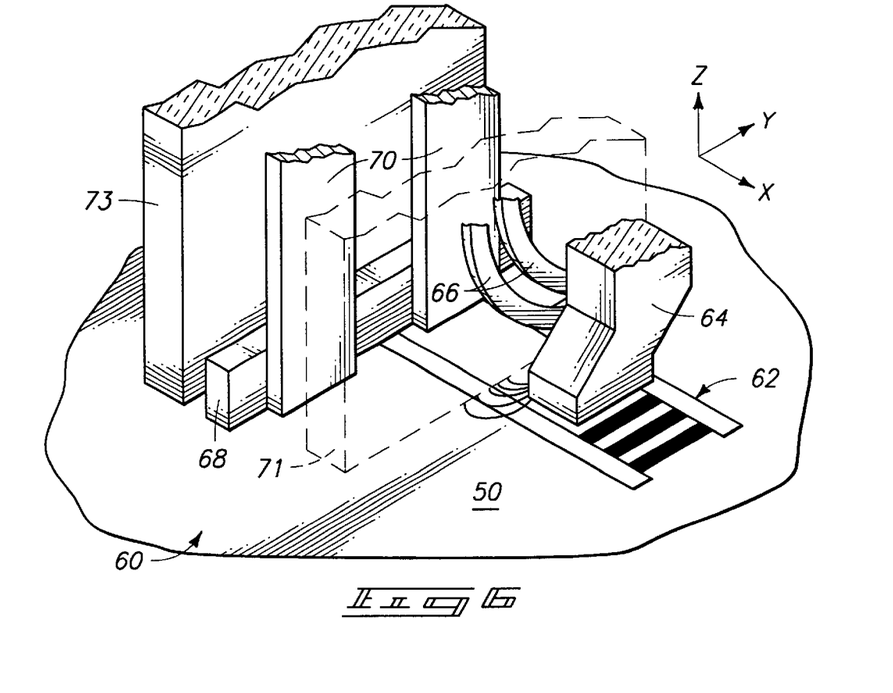
FIG. 6 is an isometric view depicting details of an exemplary head component.

Referring to FIG. 6, a portion of a head component 60 comprising a write element and a read element is depicted. Such are arranged adjacent to a data track 62 of media 50 to communicate data with respect to media 50. In the described embodiment, head components 60 are configured to communicate using linear tape-open technology in accordance with the Ultrium format. Other configurations of head components 60 are possible.

Structures 64, 71 operate as write poles to impose magnetic flux upon data track 62 to write information thereto responsive to control signals within write coils 66. A read element 68, such as a magneto-resistive element, is arranged as shown to read data previously written upon a data track. Data read by read element 68 is communicated using conductors 70. Structures 71, 73 provide magnetic shielding (structure 71 operates as a write pole for a write element and as a shield for a read element).

Referring to FIG. 7, component regions 46 adjacent a plurality of head components 60 of head member 38 are shown. Media 50 passes along a surface 72 of head member 38 adjacent respective head components 60. Movement of media 50 is in an X direction (in and out of the drawing) with respect to FIG. 7. Appropriate read and write elements (FIG. 6) of head components 60 communicate data with respect to data tracks of media 50.

In accordance with aspects of the present invention, support regions 48 are provided between or intermediate adjacent component regions 46 and head components 60. Component regions 46 include a material, such as alumina, about a plurality of layers providing the read and write elements of head components 60. Component regions 46 and head components 60 have a hardness less than substrate 44, filler block 42 and cover member 36.

Referring to FIG. 8, an insulative layer 75, such as alumina, forms component region 46 provided about layers of metallization 77 and photoresist 79 of the depicted head component 60. Component region 46 comprises a portion of insulating layer 75 about a single head component 60.

During usage of tape drive 20, abrasive properties of media 50 wear the relatively soft insulating material of component region 46 and layers comprising head components 60.

Referring again to FIG. 7, support regions 48, also referred to as lands, comprise a material different than the material of component regions 46 and head components 60. Support regions 48 are positioned to support media 50 moving along a path of travel adjacent head member 38. According to aspects of the present invention, support regions 48 individually have a hardness greater than the materials of the component regions 46 and head components 60. Support regions 48 have increased resistance to abrasive wear from media 50. In one exemplary embodiment, support regions 48 comprise $Al_2O_3TiC$ having greater hardness and resistance to wear than component regions 46, comprising material of layer 75, and head components 60. Over time, support regions 48 exhibit improved resistance to wear from media 50 and reduce pole tip recession. Support regions 48 reduce deflection of recording tape into component regions 46 of base member 38. Support regions 48 limit the width of the pole/alumina matrix of component regions 46 presented to media 50.

In the described arrangement, a distance of approximately 330 microns is provided intermediate middle portions of adjacent head components 60. A distance Q designates a track vicinity of approximately 30 microns in the depicted embodiment. It is desired to minimize the distance between individual support regions 48 and the track vicinity to provide enhanced protection from abrasive wear from media 50. Support regions 48 have a substantially triangular cross-section in one embodiment.

Additional support regions 74 are also shown elevationally below support regions 48 in FIG. 7. Support regions 74 comprise the same material as support regions 48 in one exemplary embodiment and such are utilized to insure planarity of cover member 36 to base member 34.

Various methodologies are utilized to form support regions 48, 74 in accordance with aspects of the present invention. Referring again to FIG. 8, head components 60 are formed upon substrate 44. Thereafter, insulating material is blanket deposited as an electrically insulating layer 75 over the head-components 60 upon substrate 44. Subsequent processing includes removing insulating material intermediate adjacent head components 60 in regions to form support regions 48 shown in FIG. 7. A dry etch is utilized in one processing methodology to implement removal of desired portions of insulating material. An exemplary etching process is a chlorine based reactive ion etch (RIE) if the provided insulating material is alumina.

According to one fabrication method, cover member 36 is fabricated to have pillar extensions or teeth which extend outwardly and in a mating pattern to the removed portions of insulating material. Ion milling is utilized in one embodiment to fabricate the appropriate support regions 48 upon cover member 36. Thereafter and during fabrication of head assemblies 30, 31, cover member 36 joins or is placed adjacent head member 38 and the extensions comprising support regions 48 are received intermediate appropriate adjacent head components 60 (see e.g., FIG. 4).

Alternatively, and following removal of insulating material portions of layer 75, support region material is deposited over base member 34 within the removed portions to form support regions 48. Such is typically subsequent to appropriate masking of head components 60.

Figure 9:
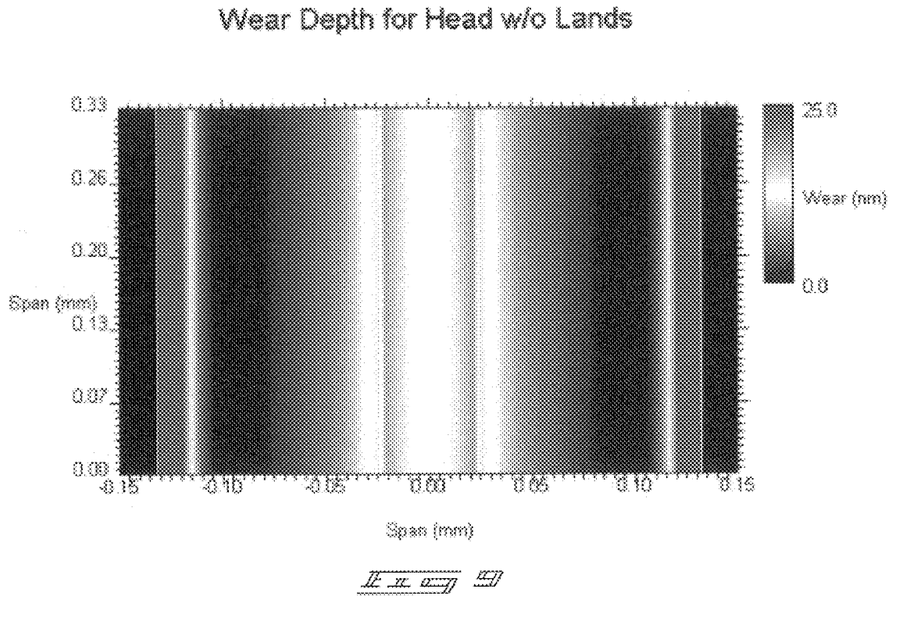
FIG. 9 is a graphical representation of wear of a conventional head assembly.
Figure 10:
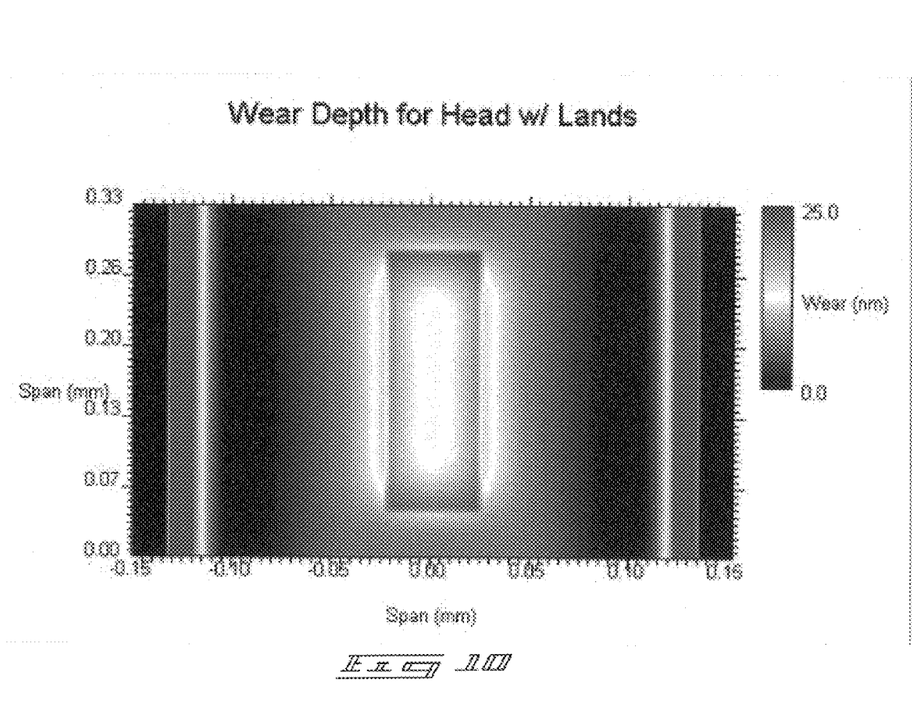
FIG. 10 is a graphical representation of wear of an exemplary head assembly embodying aspects of the present invention.
Figure 11:
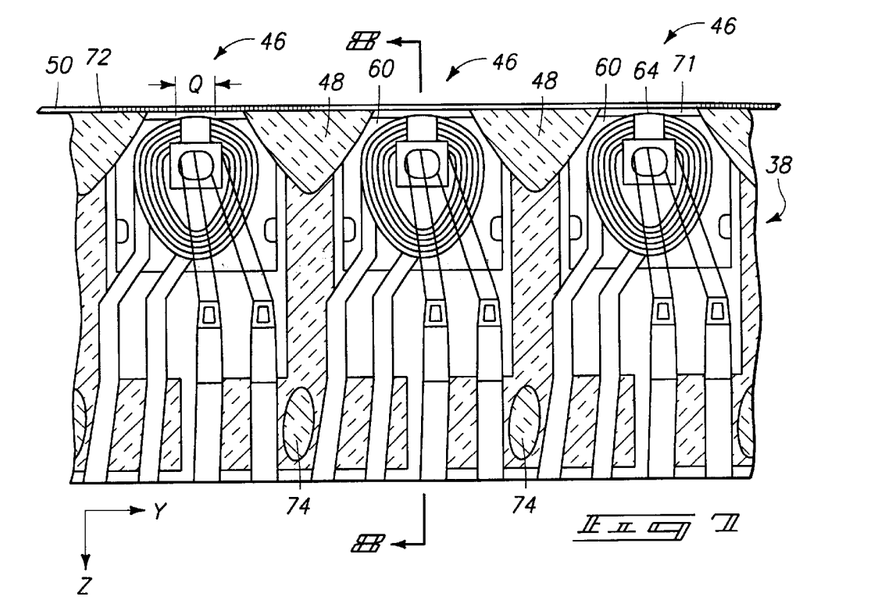
Figure 12:
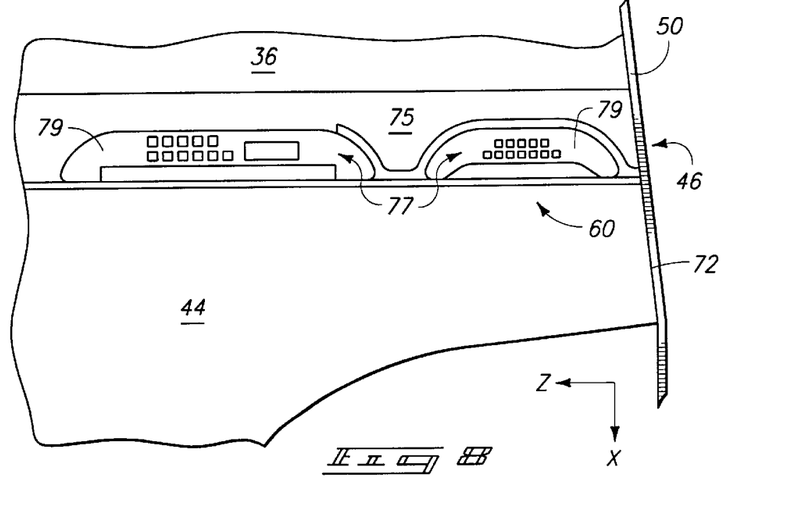

Referring to FIG. 9 and FIG. 10, respective graphical representations of wear of a conventional head assembly and a head assembly according to aspects of the present invention are illustrated. Such representations depict wear upon the head assemblies as a function of pressure applied by the media (e.g. tape) and a wear coefficient corresponding to the materials of head assembly. Media, such as tape, moves across the head assemblies from right to left or left to right.

An edge of substrate 12 is depicted in FIG. 9 at approximately −0.135 mm and an edge of cover bar 16 is depicted at approximately 0.135 mm upon the horizontal axis. The region 18 (see FIG. 1) of the conventional arrangement is depicted intermediate approximately −10.025 mm and 0.025 mm of the graph upon the horizontal axis.

An edge of substrate 40 is depicted in FIG. 10 at approximately −0.135 mm and an edge of cover member 36 is depicted at approximately 0.135 mm upon the horizontal axis. Head member 38 of the conventional arrangement is depicted intermediate approximately −0.025 mm and 0.025 mm of the graph upon the horizontal axis.

Referring to FIG. 9, it is illustrated that increased wear occurs across the entire span (from top to bottom) intermediate approximately −0.025 mm and 0.025 mm corresponding to relatively soft material of region 18.

Referring to FIG. 10, support regions 48 are provided above 0.30 mm and below 0.03 mm upon the vertical axis with a component region 46 therebetween. Support regions 48 experience less wear than the component region 46 comprising insulating material and the layers forming the head components 60 in the described embodiment and provided intermediate 0.03 mm and 0.30 mm. Such also depicts wear within the component region 46 increasing from the lower end of region 46 towards a vertical position of approximately 0.10 mm and from the upper end of region 46 to a vertical position of approximately 0.23 mm. It is illustrated to provide support regions 48 as close as possible to head elements (e.g., poles, shields) of head components 60 within respective component regions 46 to provide increased resistance to wear.

Aspects of the present invention provide reduced pole tip recession caused by wear from media to head assembly 30. Such aspects limit spacing loss enabling increased density recording.

The protection sought is not to be limited to the disclosed embodiments, which are given by way of example only, but instead is to be limited only by the scope of the appended claims.

What is claimed is:

1. A head assembly configured to communicate information relative to media comprising:
    a base member; and
    a head member adjacent the base member and comprising:
        a plurality of head components adjacent a path of travel of media and adapted to communicate information relative to the media;
        a plurality of component regions adjacent the path of travel of the media and respective ones of the head components; and
        a support region intermediate adjacent ones of the head components and positioned to support media moving along the path of travel, the support region comprising a material different than a material of the component regions;
    wherein the component regions and the support region are laterally spaced different distances with respect to a line parallel to a direction of travel of the media moving along the path of travel and are configured to contact the media moving along the path of travel.

2. The assembly in accordance with claim 1 wherein the support region material has a hardness greater than the material of the component regions.

3. The assembly in accordance with claim 1 wherein the support region material has a greater resistance to wear than the material of the component regions.

4. The assembly in accordance with claim 1 wherein the head components individually comprise a read element and a write element.

5. The assembly in accordance with claim 1 wherein the support region comprises a portion of a cover member.

6. The assembly in accordance with claim 1 wherein the head components are configured to communicate information relative to the media using Linear Tape Open technology.

7. The assembly in accordance with claim 1 wherein the base member comprises a wafer substrate.

8. The assembly in accordance with claim 1 wherein the head components are individually configured to communicate digital information relative to the media comprising a magnetic tape.

9. The assembly in accordance with claim 1 wherein the component regions and the support region are arranged in a substantially straight line in the direction substantially perpendicular to the direction of travel of the media moving along the path of travel.

10. The assembly in accordance with claim 1 wherein the component regions contact respective ones of the head components.

11. The assembly in accordance with claim 1 wherein the component regions and the support region are provided in an alternating relationship in a direction substantially perpendicular to the direction of travel.

12. A linear tape drive configured to communicate information relative to a tape comprising:
    an input/output adapted to couple with an external device;
    a cartridge receiving assembly adapted to receive a cartridge including a tape; and
    a head assembly positioned adjacent a path of travel of the tape, the head assembly comprising:
        a base member;
        a cover member adjacent the base member;
        a head member intermediate the base member and the cover member and comprising:
            a plurality of head components configured to communicate information relative to the tape including reading information from the tape and writing information to the tape;
            a plurality of component regions adjacent the path of travel of the tape and respective ones of the head components and configured to contact the tape moving along the path of travel;
            a support region intermediate adjacent ones of the head components and positioned to contact the tape moving along the path of travel, the support region comprising a material having a hardness greater than a material of the component regions; and
        wherein the component regions and the support region are arranged in a substantially straight line in a direction substantially perpendicular to a direction of travel of the tape moving along the path of travel.

13. The assembly in accordance with claim 12 wherein the component regions contact respective ones of the head components.

14. The assembly in accordance with claim 12 wherein the component regions and the support region are provided in an alternating relationship in the direction substantially perpendicular to the direction of travel.

15. An assembly configured to communicate information relative to media comprising:
    a plurality of head components laterally spaced from one another in a direction substantially perpendicular to a path of travel of media;
    a plurality of insulative material formations adjacent respective ones of the head components and configured to contact media moving along the path of travel; and
    a support region intermediate adjacent ones of the head components and the respective insulative material formations, wherein the support region comprises a material different than a material of the insulative material formations and is configured to contact the media moving along the path of travel.

16. The assembly in accordance with claim 15 wherein the insulative material formations contact respective ones of the head components.

17. The assembly in accordance with claim 15 wherein the head components, the insulative material formations and the support region are arranged in a substantially straight line in the direction substantially perpendicular to the direction of travel of the media moving along the path of travel.

18. The assembly in accordance with claim 15 wherein the insulative material formations and the support region are positioned in an alternating relationship in the direction substantially perpendicular to the path of travel.

* * * * *

UNITED STATES PATENT AND TRADEMARK OFFICE
CERTIFICATE OF CORRECTION

PATENT NO. : 6,639,753 B1
DATED : October 28, 2003
INVENTOR(S) : Henze et al.

It is certified that error appears in the above-identified patent and that said Letters Patent is hereby corrected as shown below:

Title page,
Item [56], References Cited, U.S. PATENT DOCUMENTS, please insert the following:
-- 5,055,959    10/8/91      Saliba
   6,018,444    1/25/00      Beck et al.
   5,388,014    2/7/95       Brug et al.
   5,982,573    11/9/99      Henze
   4,796,136    1/3/89       Henze et al.
   4,905,114    2/27/90      Ohta et al.
   5,768,062    6/16/98      Anderson et al.
   5,847,902    12/8/98      Clifford Jr. et al.
   5,909,661    6/1/99       Abramovich et al.
   5,774,306    6/30/98      Wang et al.
OTHER PUBLICATIONS
"HDD Technologies Key to Ultrium Tape", Simmons, Ralph; Data Storage, June 2, 2000, pp 25-28.
http://www.lto-technology.com/about/ult_primer.html; 8/29/00; pps 1-27. --.

Signed and Sealed this

Second Day of August, 2005

JON W. DUDAS
*Director of the United States Patent and Trademark Office*